(12) United States Patent
Nair et al.

(10) Patent No.: US 8,875,496 B2
(45) Date of Patent: Nov. 4, 2014

(54) REGENERATION CONTROL SYSTEM FOR EXHAUST FILTER AND METHOD

(75) Inventors: Rajesh N. Nair, Mossville, IL (US); Michael A. Snopko, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 681 days.

(21) Appl. No.: 13/171,588

(22) Filed: Jun. 29, 2011

(65) Prior Publication Data
US 2013/0000274 A1    Jan. 3, 2013

(51) Int. Cl.
*F01N 3/00*    (2006.01)
*F01N 9/00*    (2006.01)

(52) U.S. Cl.
CPC .......... *F01N 9/002* (2013.01); *F01N 2900/0408* (2013.01); *F01N 2560/05* (2013.01); *Y02T 10/47* (2013.01); *F01N 2560/12* (2013.01)
USPC .................................. 60/295; 60/297; 60/274

(58) Field of Classification Search
CPC ....... F01N 3/035; F01N 3/023; F01N 3/0222; F01N 3/021; F01N 9/002; F01N 2560/14; F01N 2560/05; F01N 2900/16; F01N 2900/1606
USPC .................... 60/274, 295, 297, 311
See application file for complete search history.

(56) References Cited

U.S. PATENT DOCUMENTS

| | | | |
|---|---|---|---|
| 4,477,771 A | 10/1984 | Nagy et al. | |
| 5,157,340 A | 10/1992 | Walton et al. | |
| 5,177,444 A | 1/1993 | Cutmore | |
| 5,497,099 A | 3/1996 | Walton | |
| 6,240,722 B1 | 6/2001 | Busch et al. | |
| 7,157,919 B1 | 1/2007 | Walton | |
| 7,253,641 B2 | 8/2007 | Knitt et al. | |
| 7,260,930 B2 | 8/2007 | Decou et al. | |
| 2004/0031386 A1* | 2/2004 | Rauchfuss et al. | 95/1 |
| 2006/0260298 A1* | 11/2006 | Iida | 60/297 |
| 2007/0022746 A1* | 2/2007 | Decou et al. | 60/295 |
| 2007/0199380 A1* | 8/2007 | Daoud | 73/596 |
| 2008/0018442 A1* | 1/2008 | Knitt | 340/438 |
| 2008/0048681 A1 | 2/2008 | Birkhofer et al. | |
| 2008/0059093 A1 | 3/2008 | Bromberg et al. | |
| 2010/0101409 A1* | 4/2010 | Bromberg et al. | 95/8 |

(Continued)

FOREIGN PATENT DOCUMENTS

| | | | | |
|---|---|---|---|---|
| JP | 10220219 | | 8/1998 | |
| JP | 10220219 A | * | 8/1998 | ........... F01N 3/02 |
| JP | 10238335 A | * | 9/1998 | ........... F01N 3/02 |
| JP | 2009057948 | | 3/2009 | |

(Continued)

*Primary Examiner* — Thomas Denion
*Assistant Examiner* — Patrick Maines
(74) *Attorney, Agent, or Firm* — Liell & McNeil Attorneys, PC

(57) ABSTRACT

A regeneration control system for an exhaust filter in an internal combustion engine system includes a first sensing mechanism for monitoring an exhaust flow resistance of the exhaust filter, and a second sensing mechanism for monitoring an attenuation of electromagnetic energy transmitted through the exhaust filter. The regeneration control system further includes an electronic controller coupled with the sensing mechanisms and configured to output a filter regeneration command responsive to an amount of particulate matter trapped within the exhaust filter. The electronic controller is further configured to weight data from the first and second sensing mechanisms in determining the amount of particulate matter. Weighting of the data may be responsive to an operating state of the internal combustion engine system. Related methodology is also disclosed.

13 Claims, 2 Drawing Sheets

(56) References Cited

U.S. PATENT DOCUMENTS

2010/0102828 A1   4/2010   Bromberg et al.
2010/0212299 A1*  8/2010   George et al. .................. 60/287
2013/0125745 A1*  5/2013   Bromberg et al. ............... 95/14

FOREIGN PATENT DOCUMENTS

KR    1020100009647         1/2010
WO    2009/031600           3/2009
WO    WO 2009031600 A2 *    3/2009  ............... F01N 9/00

* cited by examiner

REGENERATION CONTROL SYSTEM FOR EXHAUST FILTER AND METHOD

TECHNICAL FIELD

The present disclosure relates generally to systems and methodology for controlling regeneration of an exhaust filter in an internal combustion engine system, and relates more particularly to controlling regeneration via a weighting of data which is varied in response to an engine system operating state.

BACKGROUND

A great many different types of aftertreatment systems have been used in connection with internal combustion engines for decades. It is often desirable to remove particulates in exhaust from internal combustion engines, and exhaust particulate filters or "traps" are widely used for this purpose. While many exhaust particulate filters are quite effective at trapping soot, eventually the quantity of soot reaches a point at which continued operation of the engine becomes problematic or less efficient, or risks damaging the exhaust particulate filter. "Regeneration" is a term generally used to describe the process of cleansing an exhaust particulate filter of trapped soot. One common approach involves raising the temperature within the filter to a point sufficient to combust the trapped soot and convert it into less undesirable or more readily treated emissions.

A variety of different regeneration techniques are well known and widely used. Among these are the use of catalysts resident within an exhaust particulate filter or carried within engine fuel. Catalysts can assist in combustion of soot at relatively lower temperatures than what might otherwise be required. Other regeneration techniques utilize fuel injected into exhaust gases, which ignites upstream of or upon entering the exhaust particulate filter to increase the temperature therein. In-cylinder dosing of fuel or dosing into the exhaust downstream the engine are other techniques which raise filter temperature by way of an exothermic reaction without actually igniting the fuel. Electrically powered heaters, post-injections and back-pressure generating flow restriction mechanisms are also used to facilitate the combustion of trapped soot within an exhaust particulate filter. Known techniques generally have the disadvantage of expense, such as where fuel and/or catalysts are consumed, and often create efficiency penalties for the engine.

Detecting an amount of trapped soot within a filter with relative precision and accuracy can limit the frequency of regeneration, or enable regeneration at opportune times, such that the disadvantages associated with regeneration can be ameliorated. For this reason, engineers are continually seeking techniques to more accurately and precisely detect an amount of trapped soot so that underuse and overuse of regeneration can be avoided. Even seemingly miniscule improvements in detecting soot load, and thus conditions suitable for regeneration, can translate into significant real world gains in efficiency.

One general class of soot detection technologies employs electromagnetic energy transmitted through an exhaust particulate filter, and reduced in strength as a portion of the electromagnetic energy is absorbed by trapped soot. Such techniques have been known for a number of years, but rarely if ever achieve their full theoretical potential. Other soot detection strategies rely upon an observed pressure drop or phenomena related thereto, known generally as ΔP, of exhaust as it passes through an exhaust particulate filter. The relative flow resistance of the filter can be mapped to an amount of soot trapped therein. Known techniques tend to be computationally challenging, require the use of relatively expensive and complex hardware, or suffer from other shortcomings. Moreover, strategies which appear to perform acceptably in the lab or often discovered to be poorly suited to actual field conditions.

SUMMARY OF THE DISCLOSURE

In one aspect, a regeneration control system for an exhaust filter in an internal combustion engine system includes a first sensing mechanism configured to monitor an exhaust flow resistance of the exhaust filter, and a second sensing mechanism configured to monitor an attenuation of electromagnetic energy transmitted through the exhaust filter. The regeneration control system further includes an electronic controller coupled with each of the first and second sensing mechanisms, and being configured to output a filter regeneration command responsive to an amount of particulate matter trapped within the exhaust filter. The electronic controller is further configured to weight data from the first and second sensing mechanisms in determining the amount of particulate matter via a regeneration timing routine, responsive to an operating state of the internal combustion engine system.

In another aspect, an exhaust filter system for trapping particulates in an internal combustion engine system includes an exhaust filter including a housing having an inlet configured to connect with an exhaust conduit of an internal combustion engine, an outlet, and a filter medium positioned within the housing. The exhaust filter is configured to trap particulates in exhaust from the internal combustion engine. The exhaust filter system further includes a regeneration control system having a first sensing mechanism for monitoring an exhaust flow resistance of the exhaust filter, a second sensing mechanism for monitoring an attenuation of electromagnetic energy transmitted through the exhaust filter, and an electronic controller coupled with the first and second sensing mechanisms. The electronic controller is configured to determine a value indicative of an amount of particulate matter trapped within the exhaust filter and to output a filter regeneration command responsive to the determined value. The electronic controller is further configured to weight data from the first and second sensing mechanisms in determining the value, responsive to an operating state of the internal combustion engine system.

In still another aspect, a method of controlling regeneration of an exhaust filter for trapping particulates in an internal combustion engine system includes receiving a signal indicative of a change in engine system operating state, and weighting data from at least one of a first sensing mechanism configured to monitor an exhaust flow resistance of the exhaust filter and a second sensing mechanism configured to monitor an attenuation of electromagnetic energy transmitted through the exhaust filter, responsive to the signal. The method further includes commanding regeneration of the exhaust filter responsive to an amount of trapped particulates determined via executing a regeneration timing routine using the weighting of the data.

DETAILED DESCRIPTION

Figure 1:
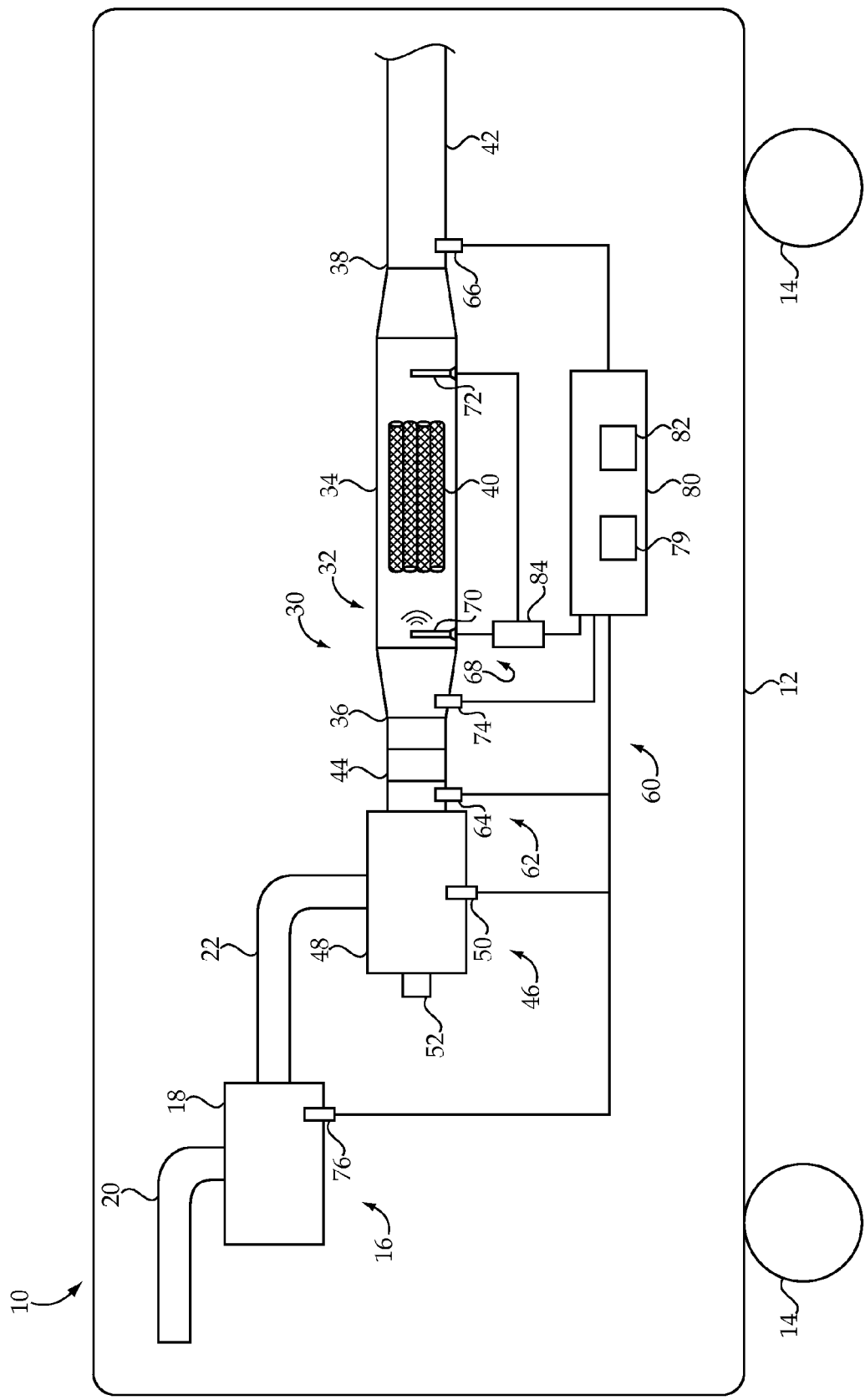
FIG. 1 is a side diagrammatic view of a machine having an exhaust filter system according to one embodiment.

Referring to FIG. 1, there is shown a machine 10 according to one embodiment. Machine 10 might include, for example, an on or off-highway truck, a track-type tractor, a motor grader, backhoe, wheel loader, scraper, or even a marine vessel. Machine 10 might still further include a stationary machine such as a genset, compressor, or pump. Machine 10 includes a frame 12 and a set of ground engaging elements 14 such as wheels or tracks coupled with frame 12. Machine 10 may further be equipped with an engine system 16 mounted to frame 12 and including an engine 18 such as a compression ignition diesel engine, providing motive power to ground engaging elements 14. Engine system 16 may further include an exhaust filter system 30 having an exhaust filter 32 for trapping particulates in exhaust from internal combustion engine 18. An intake conduit 20 is fluidly connected with engine 18 for providing air for combustion, and an exhaust conduit 22 is also fluidly connected with engine 18 and conveys exhaust from engine 18 to exhaust filter system 30, whereas an outlet conduit 42 such as a tailpipe or exhaust stack receives treated exhaust after having been passed through filter system 30, and discharges the treated exhaust in a conventional manner. A NOx reducing mechanism such as a selective catalytic reduction (SCR) module might be coupled with or part of filter system 30, and positioned downstream of exhaust filter 32.

Exhaust filter 32 includes a canister or housing 34 having an inlet 36 fluidly connected with exhaust conduit 22, an outlet 38 fluidly connected with outlet conduit 42, and a filter medium 40 positioned within housing 34 fluidly between inlet 36 and outlet 38. Filter medium 26 may include any of a wide variety of different filter media types, such as a ceramic filter medium like cordierite, a silicone carbide filter medium, or still another type of filter medium. Replaceable filter cartridges or a monolithic filter medium may be used without departing from the scope of the present disclosure. Filter medium 26 might also include resident catalyst materials, or catalyst might be carried in the engine fuel or otherwise supplied to assist in combustion of soot trapped within filter 32 for regeneration, as further described herein.

Exhaust filter system 30 may further include a regeneration mechanism 46 positioned within or forming a part of exhaust conduit 22. Regeneration mechanism 46 may include a housing 48, and an air inlet 52 formed in housing 48 for supplying air into a stream of exhaust gases passing from engine 18 to filter 32. Regeneration mechanism 46 may also include a fuel delivery device such as a fuel injector 50 for supplying a fuel, such as liquid diesel distillate, into the exhaust gases to combust, and thereby raise the temperature of gases passing to filter 32 to initiate and/or maintain combustion of soot trapped therein. Any other suitable regeneration technique such as a dosing system, electric heating elements, post injections, or a flow restrictor to raise a temperature of exhaust gases conveyed through filter 32 might be used. In one embodiment, filter 32 is at least predominantly actively regenerated; however, passive regeneration might also be used.

Exhaust filter system 30 may further include a regeneration control system 60 including a first sensing mechanism 62 configured to monitor an exhaust flow resistance of exhaust filter 32. Sensing mechanism 62 may include a first pressure sensor 64 exposed to a pressure of exhaust at a location upstream inlet 36, and a second pressure sensor exposed to a pressure of exhaust at a location downstream outlet 38. A difference between a pressure upstream filter 32 as indicated by sensor 64 and a pressure downstream filter 32 as indicated by second sensor 66 may be used to determine, estimate, or infer an amount of trapped particulates contained within filter 32. In particular, relative exhaust flow resistance indicated by comparing data from sensors 64 and 66 may be mapped to amounts of trapped particulates and possibly other factors, in a known manner. A diesel oxidation catalyst 36 may be positioned fluidly between first sensor 64 and inlet 36 in one embodiment.

Regeneration control system 60 may further include a second sensing mechanism 68 configured to monitor an attenuation of electromagnetic energy transmitted through exhaust filter 32. Second sensing mechanism 68 may include a transmitter 70 configured to transmit electromagnetic energy through exhaust filter 32, and a receiver 72 configured to sense a strength of the transmitted electromagnetic energy after having been attenuated in response to trapped soot. Comparing transmitted strength with sensed strength may indicate attenuation, in turn associated with actual or relative soot amount. A variety of different strategies might be used for leveraging data as to attenuation of the electromagnetic energy to determine, estimate, or infer an amount of trapped particulates within exhaust filter 32. In one practical implementation strategy, second sensing mechanism 68 may operate to detect an amount of trapped soot in a manner similar to that disclosed in co-pending and commonly owned U.S. patent application Ser. No. 12/969,749, filed Dec. 16, 2010. While the present disclosure is not limited to any particular frequency range of the transmitted electromagnetic energy, in one practical implementation strategy transmitter 70 may be configured to transmit a collection of electromagnetic frequencies such as a continuous band of frequencies where a frequency at the higher end of the band is less than about 2 GHz. A width of the band of transmitted frequencies may be equal to about 200 MHz in one embodiment, but again the present disclosure is not thereby limited. As used herein, "about 2 GHz" means from 1.5 GHz to 2.4 GHz. A similar convention should be used for other quantities described as "about."

Regeneration control system 60 may further include a temperature sensor 74 coupled with exhaust filter 32 and configured to sense a temperature of exhaust gases entering filter 32 via inlet 36. Interpreting data as to electromagnetic energy attenuation (as well as exhaust flow resistance) in detecting soot may take temperature into consideration. In general, higher temperature means higher attenuation. A third sensing mechanism 76 including at least one of an engine speed sensor and an engine load sensor, may also be part of regeneration control system 60 and may provide data used in determining suitability of filter 32 for regeneration, as well as or alternatively providing data used in determining how an amount of trapped particulates within filter 32 may best be detected, as further described herein.

Regeneration control system 60 may further include an electronic controller 80 coupled with first sensing mechanism 62 and second sensing mechanism 68. Electronic controller 80 may also be coupled with and in control communication with an actuator (not shown) for fuel injector 50, and further coupled with and configured to receive data from temperature sensor 74 and third sensing mechanism 76. Electronic controller 80 may include a data processor or computer 79 and a computer readable memory 82 coupled with computer 79. Electronic controller 80 may include a dedicated filter control unit, but might also comprise an engine control unit configured to monitor and control filter system 30 but also configured to monitor and control other operating aspects of engine system 16. Electronic controller 80 might further include more than one individual control unit and/or have more than one data processor or computer. Thus, two or more separately housed data processors, coupled via a communication link, could be fairly considered an "electronic controller" as that term is used herein. In one contemplated alternative embodiment, a first computer processes sensor data and determines amount of trapped particulates, and a second computer controls regeneration of filter 32, responsive to the processed sensor data. Still other system architectures are possible within the present context.

Computer readable memory 82 may store computer readable code executable by computer 79. The computer readable code may include a regeneration timing routine or algorithm, the significance of which will be further apparent from the following description. Memory 82 may include any form of suitable memory such as a hard drive, flash memory or the like. In one embodiment, second sensing mechanism 68 may also include a computer 84 configured to output signals to electronic controller 80 encoding data indicative of an attenuation of the electromagnetic energy transmitted through filter 32, for instance in decibels. As alluded to above, electronic controller 80 may be configured to control regeneration of filter 32. In particular, electronic controller 80 may be configured to output a filter regeneration command such as a command to activate fuel injector 50, responsive to an amount of particulate matter trapped within exhaust filter 32. The regeneration command might include a control signal which activates fuel injector 50, or a signal which alerts a human operator to activate regeneration or prepare machine 10 for regeneration, such as by parking it, for example. As used herein, the term "particulate matter" refers generally to soot and ash, but does not exclude other types of particulates which may be resident in relatively small amounts within filter 32. An actual or relative amount of trapped soot may serve as the "amount" of trapped particulates which is of interest.

In any event, electronic controller 80 may be configured to determine a value indicative of an amount of trapped particulate matter within exhaust filter 32 and output the filter regeneration command responsive to the determined value. The determined value may include a numeric value having a known or determinable, direct or indirect, relationship with an amount of trapped soot within exhaust filter 32. The amount of trapped soot may include a relative amount such as grams of soot per liter of available filter volume, or an actual amount such as total grams of soot. Thus, the determined value might include "x" grams soot, or "x" grams soot per liter.

As discussed above, electronic controller 80 is configured to command regeneration of filter 32 responsive to an amount of particulate matter trapped within filter 32. Electronic controller 80 may be further configured to weight data from first sensing mechanism 62 and second sensing mechanism 68 in determining the value indicative of the amount of trapped particulate matter. In one embodiment, electronic controller 80 may calculate or look up an amount of trapped soot responsive to data from at least one of sensing mechanisms 62 and 68 as a processing step in the regeneration timing routine. Weighting of the data, and adjusting the weighting, may occur responsive to an operating state of engine system 16.

It has been discovered that the accuracy of soot detection in an exhaust filter at any given time can be influenced by an operating state of the associated engine system. Thus, one strategy for detecting soot may work fine under certain engine operating conditions, but not work as well under other engine operating conditions. There tend to be numerous cross coupled variables and non-linear relationships among parameters monitored to detect soot and therefore any given soot detection strategy needs to account for relatively complex behavior if accuracy is to be optimal. The present disclosure leverages the insight that soot detection during certain patterns of engine system operation may be most accurate using one type of sensing strategy, whereas other patterns of engine system operation may be suited to a different soot detection strategy, and still others may be well suited to soot detection using a combination of sensing strategies. By relying upon data from sensing mechanisms 62 and 68 to different relative extents, and in some instances relying upon one set of data to the exclusion of the other responsive to engine system operating state, the present disclosure offers a path to improved soot detection accuracy under virtually all operating conditions, or at least reduced complexity as compared to prior techniques which seek to achieve sufficiently high soot detection accuracy via unduly complex multidimensional maps or computationally complex calculations.

It may thus be appreciated that the present disclosure contemplates giving greater weight to data from first sensing mechanism 62 and less weight to data from sensing mechanism 68 under certain conditions, and giving greater weight to data from sensing mechanism 68 and less weight to data from sensing mechanism 62 under other conditions. In certain embodiments, detecting the amount of particulate matter trapped within filter 32 may take place based solely on data from one of sensing mechanisms 62 and 68, whereas in other instances the relative weighting of the data may be reversed. It should further be appreciated that embodiments are contemplated where one of sensing mechanisms 62 or 68 is simply turned off some of the time, or where data from one of sensing mechanism 62 and 68 is not considered in determining the amount of particulate matter trapped within filter 32.

Another way to understand these principles is that electronic controller 80 may be configured to detect an amount of trapped particulate matter using data from either or both of sensing mechanisms 62 and 68 and time regeneration of filter 32 based upon the determined amount. Descriptions herein of weighting the data refers to giving relatively greater or lesser importance, or in some cases zero importance, to one of the sets of data depending upon current engine operating state. "Weighting" can refer to the raw data from the respective sensing mechanisms, but may also refer to secondary or tertiary data generated in response to the raw data. Accordingly, a soot amount determined on the basis of data from the first sensing mechanism 62 or second sensing mechanism 68 could itself be considered data from the respective sensing mechanism. Example strategies for weighting data in the form of a determined soot amount are further discussed below.

One condition of engine system 16 which has been discovered to influence the accuracy of soot detection is a relative soot loading state of exhaust filter 32. Thus, relative soot loading state may be or be a factor in the engine system operating state of interest in weighting the data. Thus, as a relative soot loading state of filter 32 changes, appropriateness of a particular data weighting strategy for soot detection, and thus appropriateness of the use of that data in regeneration timing may also change. Other engine operating states also potentially influencing the appropriateness of any particular sensing strategy may include engine speed, engine load, combinations of engine speed and engine load, exhaust temperature whether and to what extent passive regeneration of an exhaust filter is occurring, and possibly other and still to be discovered conditions or combinations of operating parameters.

In the case of a relative soot loading state of filter 32, electronic controller 80 may be configured to weight the data such that data from second sensing mechanism 68 is used at least predominantly if filter 32 is in a lower soot loading state, and such that data from sensing mechanism 62 is used at least predominantly if filter 32 is in a higher soot loading state. As alluded to above, in some instances data from one of sensing mechanism 62 and 68 might be ignored or the subject sensing mechanism simply turned off. Thus, electronic controller 80 may be further configured to weight the data such that data from the first sensing mechanism 62 is given zero weight if filter 32 is in the lower soot loading state, and data from second sensing mechanism 68 is given zero weight if filter 32 is in the higher soot loading state. In the context of the present disclosure, the terms "higher" and "lower" are used in a relative sense, meaning that at the higher soot loading state filter 32 contains a greater actual or relative amount of trapped soot than an actual or relative amount of trapped soot within filter 32 in a lower soot loading state. The higher soot loading state might include an upper one half of a soot loading capacity of filter 32, whereas the lower soot loading state might include the lower half. Filter 32 might also be fairly characterized to include a medium soot loading state, as further discussed below. In still further instances, a higher soot loading state might include the upper 10% of a soot loading range, while the lower soot loading state could include a lower 90% of a soot loading range of filter 32. If, say, 6 grams soot per liter of available filter volume is a maximum soot capacity, then the lower soot loading state might be from 0 to 2.9 grams per liter, and the higher soot loading state could be 3.0 grams per liter and higher. As noted above, actual rather than relative amounts might also be used.

Figure 2:
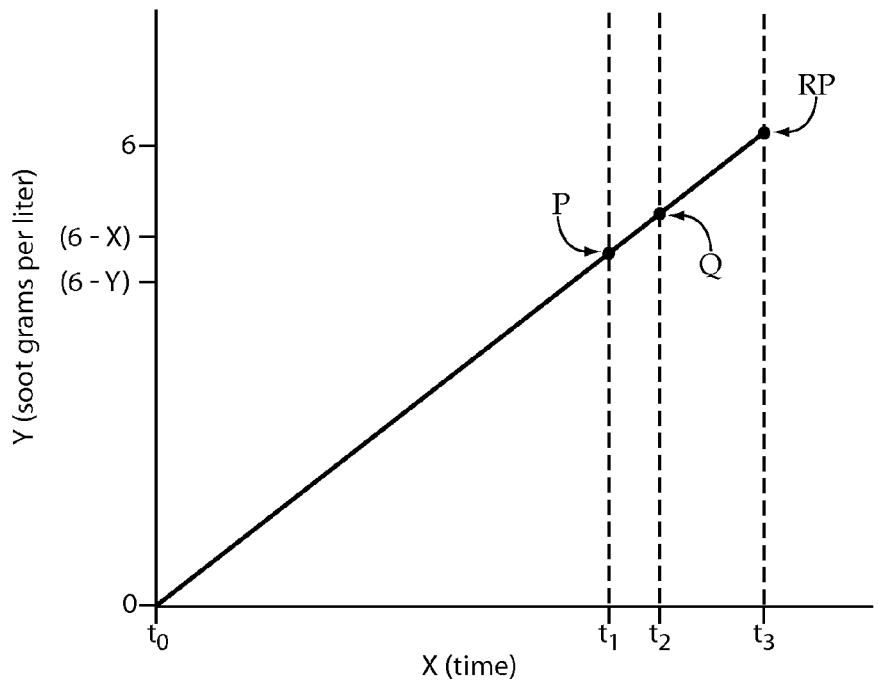
FIG. 2 is a graph of soot amount versus time in a particulate loading cycle of an exhaust filter, according to one embodiment.

Referring now to FIG. 2, there is shown a graph of soot grams per liter on the Y-axis in comparison to time on the X-axis. At a time $t_0$ filter 32 may be fairly considered to contain zero soot, such as following regeneration. At a time $t_3$ filter 32 may be understood to include a maximum allowable amount of soot such as a relative amount of soot equal to about 6 grams of soot per liter of available filter volume. Since available filter volume may depend in part upon an amount of trapped ash contained within filter 32, 6 grams soot per liter for a filter containing relatively little ash can be expected to be a different actual amount of soot than 6 grams per liter for a filter containing a greater amount of ash. A point RP is shown at a time $t_2$ and represents an approximate regeneration point at which electronic controller 80 may output a filter regeneration command. If conditions suitable for regeneration are detected prior to RP, regeneration might be commanded sooner. Also shown in FIG. 2 is a point P at a time $t_1$ and a soot amount of 6-y grams per liter. A soot loading state of filter 32 from time $t_0$ to time $t_1$ may be understood as a lower soot loading state, during which electronic controller 80 may determine an amount of trapped particulate matter based at least predominantly, and in some instances solely, upon data from second sensing mechanism 68. Another point Q is shown at a time $t_2$ and a soot amount of 6-x soot grams per liter. From time $t_2$ to time $t_3$ filter 32 may be understood as being in a higher soot loading state, during which an amount of trapped soot within filter 32 may be determined at least predominantly, and possibly solely, upon the basis of data from first sensing mechanism 62. From time $t_1$ to time $t_2$, data from the respective sensing mechanisms might be given equal weight, for instance, and a soot amount calculated on the basis of both data might be averaged.

As noted above, weighting of the data might include giving full weight to data from one of sensing mechanism 62 and 68 and zero weight to data from the other of sensing mechanism 62 and 68. Another example is giving equal weight to the respective data. Still other examples include using a multiplier to vary the relative weights given to the data incrementally or otherwise in steps over all or part of the soot loading range of filter 32. For instance, at time $t_1$ data from mechanism 68 could be given 99% weight and data from mechanism 62 given 1% weight. As soot loading progresses, the relative weights could gradually shift to 1% for mechanism 68 and 99% for mechanism 62 at time $t_2$. Other strategies for imparting different relative weights to data will be apparent to those skilled in the art.

As discussed above, an amount of trapped particulate matter, notably soot, within filter 32 is a factor in determining whether filter 32 should be regenerated. Other factors relating to operation of engine system 16 may also be relevant to determining suitability of filter 32 for regeneration. Those skilled in the art will be familiar with the existence of certain conditions relating to how an engine system or machine associated therewith is being used which can negatively or positively influence the appropriateness or need to regenerate an associated exhaust particulate filter at any given time. For example, when a machine such as a truck is idling for an extended period of time, it may be concluded that regeneration is unlikely to interfere with operation of the machine or the duties of the machine operator, and therefore such conditions might be considered suitable for regeneration. This may be the case even where the exhaust filter has a relatively small amount of trapped soot therein. In other instances, various inputs as to operation of the associated engine or machine may indicate that regeneration is not desirable despite a relatively high amount of soot. One example of such a case would be where it is apparent that the machine is in the midst of active work, where engine speed and/or engine load are high or rapidly changing, or where the machine is traveling at relatively high speed on a highway or the like and thus regeneration is not desirable. In any event, third sensing mechanism 76 may output data to electronic controller 80 which electronic controller 80 may also use in determining regeneration suitability of filter 32.

INDUSTRIAL APPLICABILITY

Figure 3:
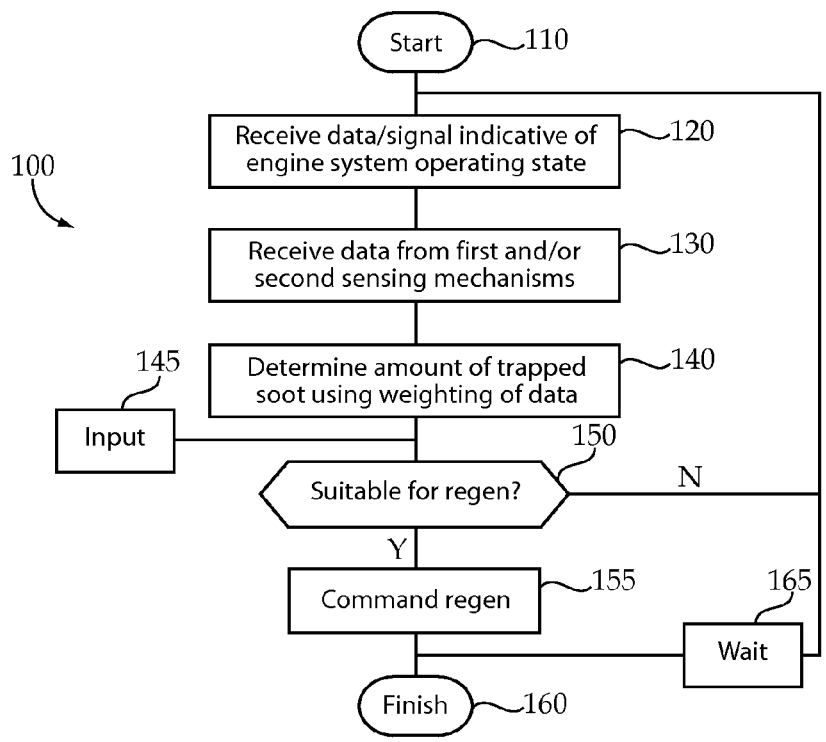
FIG. 3 is a flowchart illustrating a control process according to one embodiment.

Referring now to FIG. 3, there is shown a flowchart 100 illustrating an example control process for timing regeneration according to the present disclosure. The process of flowchart 100 may start at step 110, and proceed to step 120 to receive data indicative of an engine system operating state. From step 120 the process may proceed to step 130 to receive data from at least one of first sensing mechanism 62 and second sensing mechanism 68. As noted above, the engine system operating state may include a relative soot loading state. The signal or data received at step 120 could therefore simply be a signal indicating a previously determined soot loading state. It will be recalled that electronic controller 80 may use data from one or both of sensing mechanisms 62 and 68 to relative extents which are based on how much soot is trapped within filter 32. The previously determined soot loading state could be recorded on memory 82, for instance. Step 120 may therefore be understood as the receipt of data which tells controller 80 how to interpret subsequent data, such as how to weight it. From step 130, the process may proceed to step 140 at which electronic controller 80 may determine an updated amount of trapped soot using a weighting of the data as described herein.

Where the signal received in step 120 indicates that engine system operating state has changed from a prior state to a new operating state, such as by passing a soot loading threshold, execution of step 140 may include adjusting a weighting of the data from first and/or second sensing mechanism 62 and 68. Where the signal indicates a change from an engine system operating state which includes a lower soot loading state to a higher soot loading state as described herein, the weighting of the data may be adjusted such that data from first sensing mechanism 62 is used at least predominantly in determining the amount of trapped particulates. Where the signal received in step 120 is indicative of a change from a higher soot loading state of exhaust filter 32 to a cleaned filter state following regeneration, electronic controller 80 may weight the data in step 140 such that data from second sensing mechanism 68 is used at least predominantly in determining the amount of trapped particulates.

From step 140, the process may proceed such that an input 145 is received, and to step 150 to query whether conditions are suitable for regeneration of filter 32. The input 145 might be received in response to controller 80 interrogating sensors, another controller, or even a human operator to determine if conditions apart from soot amount indicate that regeneration is appropriate or not. If no, the process may loop back to execute steps 120-150 again, or might simply exit. If, at step 150, conditions are suitable for regeneration, the process may proceed to step 155 at which electronic controller 80 may output a regeneration command. From step 155, the process may proceed to execute a wait cycle at step 160, and then may loop back to execute steps 120-155 again. Where monitoring of filter system 30 for timing regeneration is to conclude, the process of flowchart 100 may end at step 165.

In one embodiment, the determination of suitability for regeneration at step 150 may take different paths or consider whether different combinations or values of operating parameters exist based upon whether filter 32 is in a higher soot loading state or a lower soot loading state. For instance, at a lower soot loading state a first combination of amount of trapped particulate matter, engine speed, engine load, or history of engine speed and engine load might satisfy a first regeneration suitability condition. At a higher soot loading state, a different combination of amount of trapped particulate matter, engine speed, engine load, or history of engine speed and engine load, may satisfy a second regeneration suitability condition.

As noted above, the criteria for determining suitability of regeneration may differ based upon the relative soot loading state of exhaust filter 32. In general terms, when exhaust filter 32 is more lightly loaded with soot electronic controller 80 may be thought of as looking for convenient opportunities to at least partially regenerate exhaust filter 32, whereas at higher soot loads a more imminent need for regeneration rather than merely convenience may exist. Rather than simply two different regeneration suitability conditions based upon whether exhaust filter 32 is in one of two soot loading states, embodiments are contemplated wherein more than two different regeneration suitability conditions are evaluated, possibly many across the entire soot loading range of exhaust filter 32. In a practical implementation strategy, the first regeneration suitability condition may include at least one criterion other than the amount of particulate matter trapped within exhaust filter 32. The at least one criterion might include an engine speed parameter, an engine load parameter, a temperature parameter such as a filter inlet temperature parameter or an engine temperature parameter, or a machine travel parameter indicating whether machine 10 is traveling. As noted above, if machine 10 is traveling, in some instances it may be determined that conditions are not suitable for regeneration. It should also be appreciated that the particular regeneration protocol, in other words the manner in which exhaust filter 32 is regenerated, might differ based upon engine operating state.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A regeneration control system for an exhaust filter in an internal combustion engine system comprising:
    a first sensing mechanism configured to monitor an exhaust flow resistance of the exhaust filter;
    a second sensing mechanism configured to monitor an attenuation of electromagnetic energy transmitted through the exhaust filter;
    an electronic controller coupled with each of the first and second sensing mechanisms, the electronic controller being configured to output a filter regeneration command responsive to an amount of particulate matter trapped within the exhaust filter; and
    the electronic controller being further configured to weight data from the first and second sensing mechanisms in determining the amount of particulate matter via a regeneration timing routine, responsive to an operating state of the internal combustion engine system;
    wherein the operating state of the internal combustion engine system includes a relative soot loading state of the exhaust filter; and
    wherein the electronic controller is configured to weight the data such that data from the first sensing mechanism is given zero weight if the exhaust filter is in a lower soot loading state, and data from the second sensing mechanism is given zero weight if the exhaust filter is in a higher soot loading state.

2. The system of claim 1 wherein the electronic controller is configured to determine whether a first regeneration suitability condition is satisfied if the exhaust filter is in the lower soot loading state, and whether a second, different regeneration suitability condition is satisfied if the exhaust filter is in the higher soot loading state.

3. The system of claim 2 wherein the first regeneration suitability condition includes at least one criterion other than the amount of particulate matter trapped within the exhaust filter.

4. The system of claim 3 wherein the at least one criterion includes an engine speed parameter, an engine load parameter, a temperature parameter, or a machine travel parameter.

5. The system of claim 1 wherein:
    the first sensing mechanism includes a first sensor exposed to a pressure of exhaust within an exhaust conduit of the internal combustion engine system at a location upstream of the exhaust filter and a second sensor exposed to a pressure of exhaust within the exhaust conduit at a location downstream of the exhaust filter; and
    the second sensing mechanism includes a transmitter configured to transmit electromagnetic energy through the exhaust filter, and a receiver configured to sense a strength of the transmitted electromagnetic energy after having been attenuated in response to trapped soot within the exhaust filter.

6. An exhaust filter system for trapping particulates in an internal combustion engine system comprising:
    an exhaust filter including a housing having an inlet configured to connect with an exhaust conduit of an internal combustion engine, an outlet, and a filter medium positioned within the housing, the exhaust filter being configured to trap particulates in exhaust from the internal combustion engine; and a regeneration control system including a first sensing mechanism for monitoring an exhaust flow resistance of the exhaust filter, a second sensing mechanism for monitoring an attenuation of electromagnetic energy transmitted through the exhaust filter, and an electronic controller coupled with the first and second sensing mechanisms;

the electronic controller being configured to determine a value indicative of an amount of particulate matter trapped within the exhaust filter and to output a filter regeneration command responsive to the determined value, and wherein the electronic controller is further configured to weight data from the first and second sensing mechanisms in determining the value, responsive to an operating state of the internal combustion engine system;

wherein the operating state of the internal combustion engine system includes a relative soot loading state of the exhaust filter; and wherein the electronic controller is configured to weight the data such that data from the first sensing mechanism is given zero weight if the exhaust filter is in a lower soot loading state, and data from the second sensing mechanism is given zero weight if the exhaust filter is in a higher soot loading state.

7. The system of claim 6 wherein the first sensing mechanism includes a first pressure sensor exposed to a pressure of exhaust at a location upstream the inlet, and a second pressure sensor exposed to a pressure of exhaust at a location downstream the outlet.

8. The system of claim 7 further comprising the exhaust conduit, and a diesel oxidation catalyst positioned within the exhaust conduit at a location downstream the first pressure sensor and upstream the inlet.

9. The system of claim 6 wherein the second sensing mechanism includes a transmitter configured to transmit electromagnetic energy through the exhaust filter, and a receiver configured to sense a strength of the transmitted electromagnetic energy after having been attenuated in response to trapped soot.

10. The system of claim 9 wherein the transmitter is configured to transmit a band of electromagnetic frequencies less than about 2 GHz.

11. The system of claim 6 further comprising a third sensing mechanism coupled with the electronic controller, and wherein the electronic controller is further configured to determine regeneration suitability of the exhaust filter responsive to data from the third sensing mechanism.

12. The system of claim 11 wherein the third sensing mechanism includes at least one of an engine speed sensor and an engine load sensor.

13. A method of controlling regeneration of an exhaust filter for trapping particulates in an internal combustion engine system comprising the steps of:

receiving a signal indicative of a change in engine system operating state;

weighting data from at least one of a first sensing mechanism configured to monitor an exhaust flow resistance of the exhaust filter and a second sensing mechanism configured to monitor an attenuation of electromagnetic energy transmitted through the exhaust filter, responsive to the signal; and commanding regeneration of the exhaust filter responsive to an amount of trapped particulates determined via executing a regeneration timing routine using the weighting of the data;

wherein the step of receiving includes receiving a signal indicative of a change from a lower soot loading state of the exhaust filter to a higher soot loading state;

wherein the step of weighting data further includes adjusting a weighting of the data from a first weighting where the data from the first sensing mechanism is given zero weight in determining an amount of the trapped particulates to a second weighting where the data from the second sensing mechanism is given zero weight in determining the amount of trapped particulates.

* * * * *